(12) United States Patent
Tanabe et al.

(10) Patent No.: US 11,325,194 B2
(45) Date of Patent: May 10, 2022

(54) THIN DRILL

(71) Applicant: SHIBA R&D CO., LTD, Yokosuka (JP)

(72) Inventors: Katsuji Tanabe, Yokosuka (JP); Fumiharu Kawamata, Yokosuka (JP); Yohei Matsushima, Yokosuka (JP)

(73) Assignee: SHIBA R&D CO., LTD, Yokosuka (JP)

( * ) Notice: Subject to any disclaimer, the term of this patent is extended or adjusted under 35 U.S.C. 154(b) by 0 days.

(21) Appl. No.: 16/471,769

(22) PCT Filed: Mar. 5, 2018

(86) PCT No.: PCT/JP2018/008342
§ 371 (c)(1),
(2) Date: Jun. 20, 2019

(87) PCT Pub. No.: WO2019/058592
PCT Pub. Date: Mar. 28, 2019

(65) Prior Publication Data
US 2020/0206830 A1     Jul. 2, 2020

(30) Foreign Application Priority Data

Sep. 20, 2017   (JP) .............................. JP2017-180760
Nov. 21, 2017   (JP) .............................. JP2017-224057

(51) Int. Cl.
*B23B 51/06*     (2006.01)
*B23Q 11/10*     (2006.01)

(52) U.S. Cl.
CPC .............. *B23B 51/06* (2013.01); *B23Q 11/10* (2013.01); *B23B 2250/12* (2013.01)

(58) Field of Classification Search
CPC . B23B 51/06; B23B 2250/12; B23B 2251/02; B23B 2251/50; B23B 2251/18; B23B 51/0486; B23Q 11/10
See application file for complete search history.

(56) References Cited

U.S. PATENT DOCUMENTS 997,525 A * 7/1911 Floyd ..................... B65D 49/04
                                                        215/26
2,411,209 A * 11/1946 Furth ........................ F28G 3/14
                                               15/104.09
(Continued)

FOREIGN PATENT DOCUMENTS

CN       203371088 U     1/2014
CN       203495297 U     3/2014
(Continued)

OTHER PUBLICATIONS

International Search Report and Written Opinion for International Application PCT/JP2018/008342 dated Apr. 24, 2018.
(Continued)

*Primary Examiner* — Eric A. Gates
*Assistant Examiner* — Paul M Janeski
(74) *Attorney, Agent, or Firm* — Andrus Intellectual Property Law, LLP

(57) ABSTRACT

[Problem] To protect a leading end part of a drill having a coolant hole which is adapted for drilling a thin diameter or very thin diameter hole in a workpiece.
[Solution] A coolant hole 33 is formed in a shank 3 and a shaft body 7 so as to extend through from a rear end surface 31 of the shank 3 to a leading end surface 15 of the shaft body 7 along an axis thereof. A leading end part of the coolant hole 33 is branched into a pair of discharge holes 35, at a position slightly toward a base end relative to the leading end surface 15 of the shaft body 13. The discharge holes 35 extend in the opposite directions, perpendicular to the cool-
(Continued)

ant hole 33, respectively, and open at opposite side surfaces 37, 37 to define discharge ports 39, 39. A leading end opening 41 of the coolant hole 33 is closed by a bottom face 17 of the drill part 9.

18 Claims, 11 Drawing Sheets

(56) References Cited

U.S. PATENT DOCUMENTS

| | | | | |
|---|---|---|---|---|
| 5,354,155 A | * | 10/1994 | Adams | B23B 51/00 |
| | | | | 408/145 |
| 5,980,166 A | * | 11/1999 | Ogura | B23B 51/02 |
| | | | | 408/144 |
| 5,993,120 A | * | 11/1999 | Giessler | B23G 5/005 |
| | | | | 408/222 |

FOREIGN PATENT DOCUMENTS

| | | | | |
|---|---|---|---|---|
| CN | 104907612 A | | 9/2015 | |
| CN | 105873735 A | | 8/2016 | |
| CN | 205464488 U | | 8/2016 | |
| GB | 997525 A | * | 7/1965 | ............ B23P 15/32 |
| JP | 1985-109868 U1 | | 7/1985 | |
| JP | 1985142011 A | | 6/1987 | |
| JP | 2002-137108 A | | 5/2002 | |
| JP | 2003-275915 A | | 9/2003 | |
| JP | 2004-195559 A | | 7/2004 | |
| JP | 2009-806 A | | 1/2009 | |
| JP | 2016-120551 A | | 7/2016 | |
| WO | 02-5990 A1 | | 1/2002 | |
| WO | WO-2015159493 A1 | * | 10/2015 | ............ B23B 51/06 |

OTHER PUBLICATIONS

Journal of Technical Disclosure, issued by Japan Institute of Invention and Innovation Journal No. 93-8145. Issued Mar. 1, 1993.

Office Action for corresponding Chinese Patent Application No. 201880021175.7 dated Jul. 3, 2020.

Office Action for corresponding Japanese Patent Application No. 2017-224057 dated Dec. 15, 2017.

Korean Notification of Reason for Refusal for corresponding Korean Application No. 10-2019-7016355 dated Oct. 28, 2021.

* cited by examiner (a)

(b)

(c)

(a)

(b)

(a)

(b)

THIN DRILL

CROSS-REFERENCE TO RELATED APPLICATIONS

This application is the U.S. national stage application of International Application No. PCT/JP2018/008342, filed Mar. 5, 2018, which international application was published on Mar. 29, 2018, as International Publication WO 2019/058592 A1 in the Japanese language and which application is incorporated herein by reference. The international application claims priorities of Japanese Patent Application Nos. 2017-180760, filed Sep. 20, 2017, and 2017-224057, filed Nov. 21, 2017, which applications are incorporated herein by reference.

TECHNICAL FIELD

The invention relates to a thin or very thin drill suitable for drilling a hole of a thin diameter (small diameter) or very thin diameter (small diameter) in a silicon wafer, a product made of a hard brittle material such as glass, ceramics or silicon, or the like.

BACKGROUND ART

For the purpose of drilling a hole in a workpiece (object to be processed), used is a drill having a drill shaft formed with helical discharge flutes or chip discharge flutes extending from a leading end to a base end part of the drill shaft, and the discharge flutes are adapted for discharging chips of the workpiece produced by rotating cutting edges formed on a leading end of the drill shaft, through the discharge flutes (for example, Patent Literature 1). For drilling a hole in a relatively soft workpiece, for example, made of a metallic material with producing continuous chips during drilling operation, such a drill having helical discharge flutes allows for discharging effectively the continuous chips along the helical discharge flutes. On the other hand, for drilling a hole in a relatively brittle workpiece, for example, made of glass with producing powder-like chips during drilling operation, such a drill does not perform the specific function of discharging chips effectively, and the chips are easily collected in a hole being drilled by such a drill. Further, when a drill has a thin or very thin drill shaft for drilling a hole of a small diameter or very small diameter, for example, of about 0.3 mm to 2.00 mm in the workpiece, strength of the drill shaft is significantly lowered by forming the drill shaft with long helical discharge flutes. When the drill is adapted for a hard workpiece, for example, made of silicon, there is a possibility that the chips collected in the hole readily cause breakdown of the drill.

When such a drill having helical discharge flutes is used, a grinding or drilling cycle—grinding or drilling a hole by a drill, removing the drill out of the ground or drilled hole, supplying coolant fluid in the ground or drilled hole to discharge chips, applying the drill in the ground or drilled hole—must be repeated many times, as a result, it takes a long time for drilling operation. Further, for the hole ground or drilled deep, it is impossible to discharge the chips collected in a bottom of the ground or drilled hole sufficiently even by supplying a coolant fluid in the hole, and a tolerable time period spent for continuous grinding or drilling operation by a drill must be shortened in order to prevent breakout of the drill, and as a result, it takes a longer time for completing the grinding or drilling operation.

One idea to solve such inconvenience is to form a drill with a coolant hole which opens at a leading end of the drill shaft (for example, refer to Patent Literature 2). However, a thin drill is lowered in strength by forming with long helical discharge flutes. When such a thin drill is further formed with a coolant hole, a strength required for drilling a hole is not ensured for the thin drill.

Then, as to a thin drill shaft adapted for drilling a small-diameter hole in a product, for example, made of a hard brittle material such as glass, ceramics or silicon, or the like, a thin drill shaft should be designed in a shape, for example, of a pyramid or the like which allows for discharge of chips, and should be formed with a coolant hole which opens at a leading end of the drill shaft.

PRIOR ART LITERATURE

Patent Literature

Patent Literature 1: JP 2002-137108 A
Patent Literature 2: JP 2004-195559 A

SUMMARY OF THE INVENTION

Problem to be Solved by the Invention

Such a drill shaft has high strength since it does not have a long helical discharge flute. And, during drilling operation, a gap is defined between an outline of a polygonal section of the shaft body and a circular hole machined or a hole ground or drilled in a workpiece. Therefore, when powdery chips of the workpiece are produced, the powdery chips are flown and discharged by coolant fluid which is discharged from a leading end of the shaft body through the gap.

However, the coolant hole of the drill shaft opens at the leading end of the drill shaft, and an opening of the coolant hole is located at a cutting edge part. Depending on a material or shape of the cutting edge part, sometimes, a test process is required to confirm whether the cutting edge has strength sufficient for drilling a hole. Or, there may be a problem in manufacturing of a drill such as difficulty in forming an opening of the coolant hole.

Then, the object of the present invention is to provide a thin or very thin drill which solves at least one of problems in the conventional drills for drilling a small diameter or very small diameter hole in a workpiece.

Means for Solving the Problem

A drill according to the present invention in order to achieve the foregoing object relates to a drill or a thin drill adapted for drilling a hole or hole of a small diameter. For example, the drill comprises a shank and a drill shaft which is provided on the shank, the drill shaft has a shaft body extending from a leading end of the shank, and a drill part which is provided on a leading end of the shaft body and has a cutting edge part or grinding edge part formed with a cutting edge or a grinding edge, a coolant hole is formed so as to extend along an axis in the shank and in the drill shaft, and a discharge hole is branched from the coolant hole at a position rearward of the cutting edge in a leading end part of the drill shaft and opens at an outer periphery of the drill shaft to define a discharge opening. The shaft body may have a polygonal cross-section (for example, a square cross-section) or a circular cross-section. The shaft body is formed, for example, with an outer peripheral surface without discharge flute or helical discharge flute. Or, the shaft body is formed with an outer peripheral surface without discharge flute or helical discharge flute, for example, at a position rearward of a leading end part of the shaft body. The coolant hole extending along the axis opens outwardly of the drill shaft, for example, only at the discharge opening of the discharge hole branched from the coolant hole. The discharge hole or the discharge opening may be formed in the leading end part of the shaft body, or may be formed in the drill part. In the latter case, the discharge hole or the discharge opening is formed at a position rearward of the cutting edge part, for example, a drilling edge part of the drill part. The discharge hole may be branched from the coolant hole at a leading end of the coolant hole. Or, the coolant hole may not extend forward of a position where the discharge hole is branched from the coolant hole. Further, the discharge hole may be formed perpendicular to the coolant hole.

A drill according to the present invention relates to a drill or a thin drill adapted for drilling a hole or a small-diameter hole. For example, the drill comprises a shank and a drill shaft provided on the shank, the drill shaft has a shaft body extending from a leading end of the shank and a drill part attached to or fixedly attached to a leading end of the shaft body, the drill part has a cutting edge part or a grinding edge part which is formed with a cutting edge or a grinding edge as well as a discharge flute, for example, a helical discharge flute, a coolant hole extends along an axis in the shank and the shaft body, and opens at a leading end surface of the shaft body to define a coolant opening, a discharge hole is branched from the coolant hole in a leading end part of the shaft body and opens at an outer periphery of the shaft body to define a discharge opening, the coolant opening at the leading end surface of the shaft body is closed by the drill part, and the leading end part or a leading end side of the shaft body is formed with a discharge flute which continues or extends continuously from the discharge flute of the drill part to the discharge opening. The continuous discharge flute may extend beyond a position of the discharge hole or the discharge opening. Or, the continuous discharge flute may extend to the position of the discharge hole or the discharge opening.

Further, a drill according to the present invention relates to a drill or a thin drill adapted for drilling a hole or a small-diameter hole. For example, the drill comprises a shank and a drill shaft provided on the shank, the drill shaft has a shaft body extending from a leading end of the shank and a drill part attached to or fixedly attached to a leading end of the shaft body, the drill part has a cutting edge part or a grinding edge part which is formed with a cutting edge or a grinding edge, a coolant hole extends along an axis in the shank and the shaft body, and opens at a leading end surface of the shaft body to define a coolant opening, a discharge hole is branched from the coolant hole in a leading end part of the shaft body and opens at an outer periphery of the shaft body to define a discharge opening, and the coolant opening at the leading end surface of the shaft body is closed by the drill part.

According to the present invention, for example, a drill or a thin drill adapted for drilling a hole or a small diameter hole comprises a shank and a drill shaft provided on the shank, the drill shaft has a shaft body extending from a leading end of the shank and a drill part fixedly attached to a leading end of the shaft body, the drill part has a cutting edge part which is formed with a cutting edge, a coolant hole extends along an axis in the shank and the shaft body, and opens at a leading end surface of the shaft body to define a coolant opening, a discharge hole is branched from the coolant hole, at a position rearward of the leading end surface in a leading end part of the shaft body and opens at an outer periphery of the shaft body to define a discharge opening, and the coolant opening at the leading end surface of the shaft body is closed by the drill part. Here, the shaft body may be formed with an outer peripheral surface without discharge flute or helical discharge flute, and the drill part may be formed with an outer peripheral surface without discharge flute or helical discharge flute. The discharge hole may be formed at a position rearward of the leading end surface in the leading end part of the shaft body. This configuration allows for firmly fixing the drill part to the leading end surface of the shaft body, and eliminating the possibility of separating the drill part from the leading end surface of the shaft body during drilling operation. And, this configuration thus eliminates the possibility that a molten metal or a fused solder enters the discharge hole during brazing operation for the drill part, then cures in the discharge hole with result in closing the discharge hole.

More specifically, for example, the shaft body has a base end part extending from the leading end of the shank, and a body part extending from a leading end of the base end part, the drill part is fixedly attached to a leading end surface of the body part, and closes the coolant opening at the leading end surface, and the body part is formed into a prism shape such as a square prism shape or a quadrangular prism shape and has an outer peripheral surface without discharge flute or helical discharge flute. The drill part has a cutting edge part of a pyramid shape such as a square pyramid shape or a quadrangular pyramid shape, and has an outer peripheral surface without discharge flute or helical discharge flute, and a discharge hole is formed at a position rearward of the leading end surface in a leading end part of the body part and opens at the outer peripheral surface of the body part to define the discharge opening. Or, for example, the shaft body has a base end part extending from the leading end of the shank, and a body part extending from a leading end of the base end part, the drill part is fixedly attached to a leading end surface of the body part, and closes the coolant opening at the leading end surface, the body part is formed into a cylindrical shape, and has an outer peripheral surface without discharge flute or helical discharge flute, the drill part is formed also in a cylindrical shape, and has an outer peripheral surface without discharge flute or helical discharge flute, and the discharge hole is formed at a position rearward of the leading end surface in the leading end part of the body part and opens at the outer peripheral surface of the body part to define the discharge opening.

The discharge hole may be formed such that a leading end or a front end of the discharge hole is spaced from the leading end surface of the shaft body by a length longer than a diameter of the coolant hole of the shaft body, or such that the leading end or the front end of the discharge hole is spaced from the leading end surface of the body part by a length longer than a diameter of the coolant hole of the body part. A sufficient distance spaced from the leading end surface to the discharge hole prevents a molten metal or a fused solder from flowing through the coolant hole until the molten metal or the fused solder reaches to the discharge hole during brazing operation. The shaft body or the drill part without discharge flute or helical discharge flute eliminates a possibility that a coolant discharged through the discharge hole is pressurized strongly in a discharge direction.

Effects of the Invention

The drill or the thin drill according to the present invention has a coolant hole which does not open at a cutting edge part, for example, a drilling edge part of the drill part. This configuration prevents problems of lowered strength of the cutting edge part, for example, the drilling edge part of the drill part, or problems of difficulties in production of a drill.

MODE FOR CARRYING OUT THE INVENTION

With reference to the drawings, embodiments of the present invention are described below.

Figure 1:
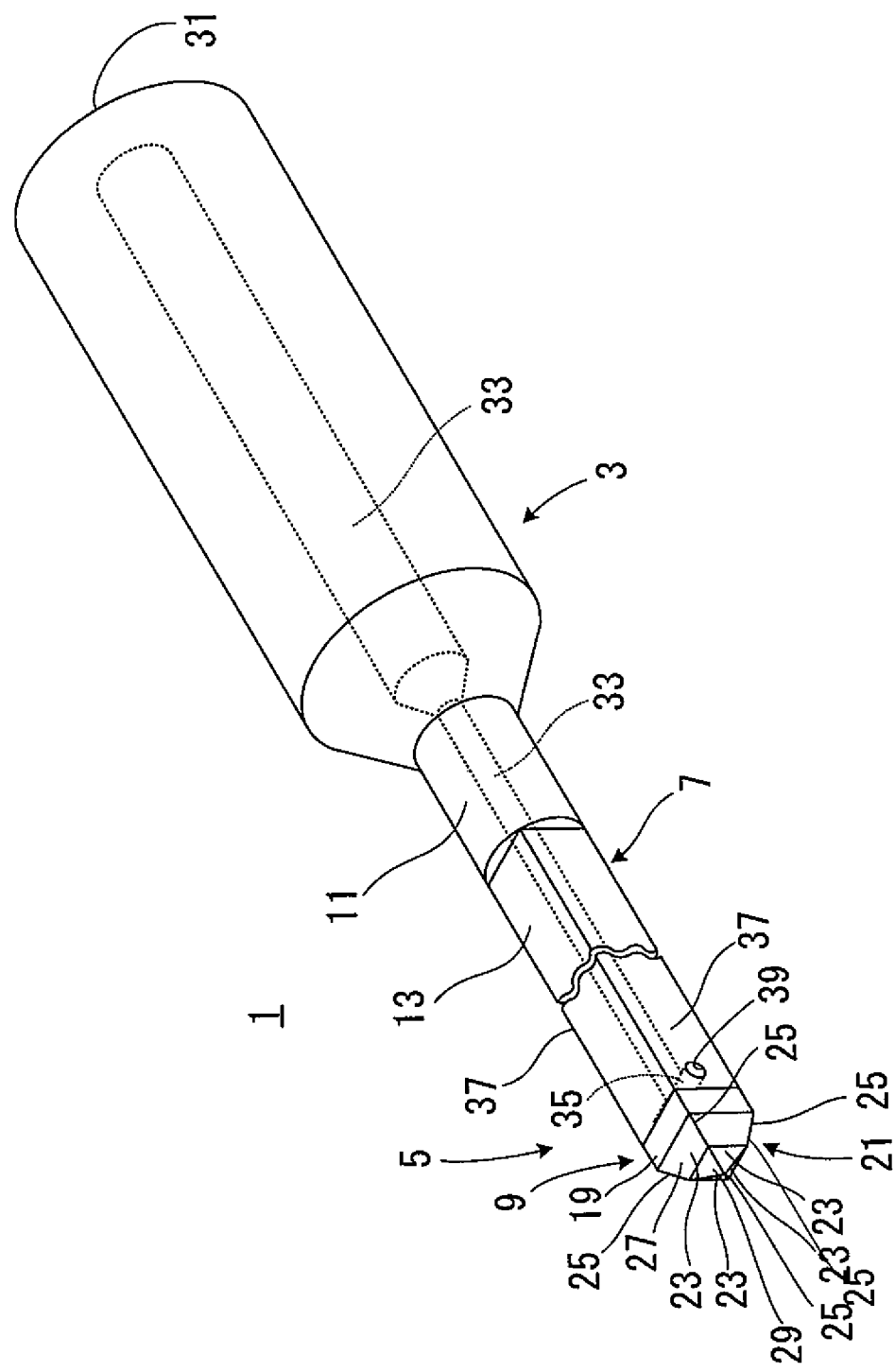
FIG. 1 is a perspective view showing a whole shape of a first drill of the present invention.
Figure 2:
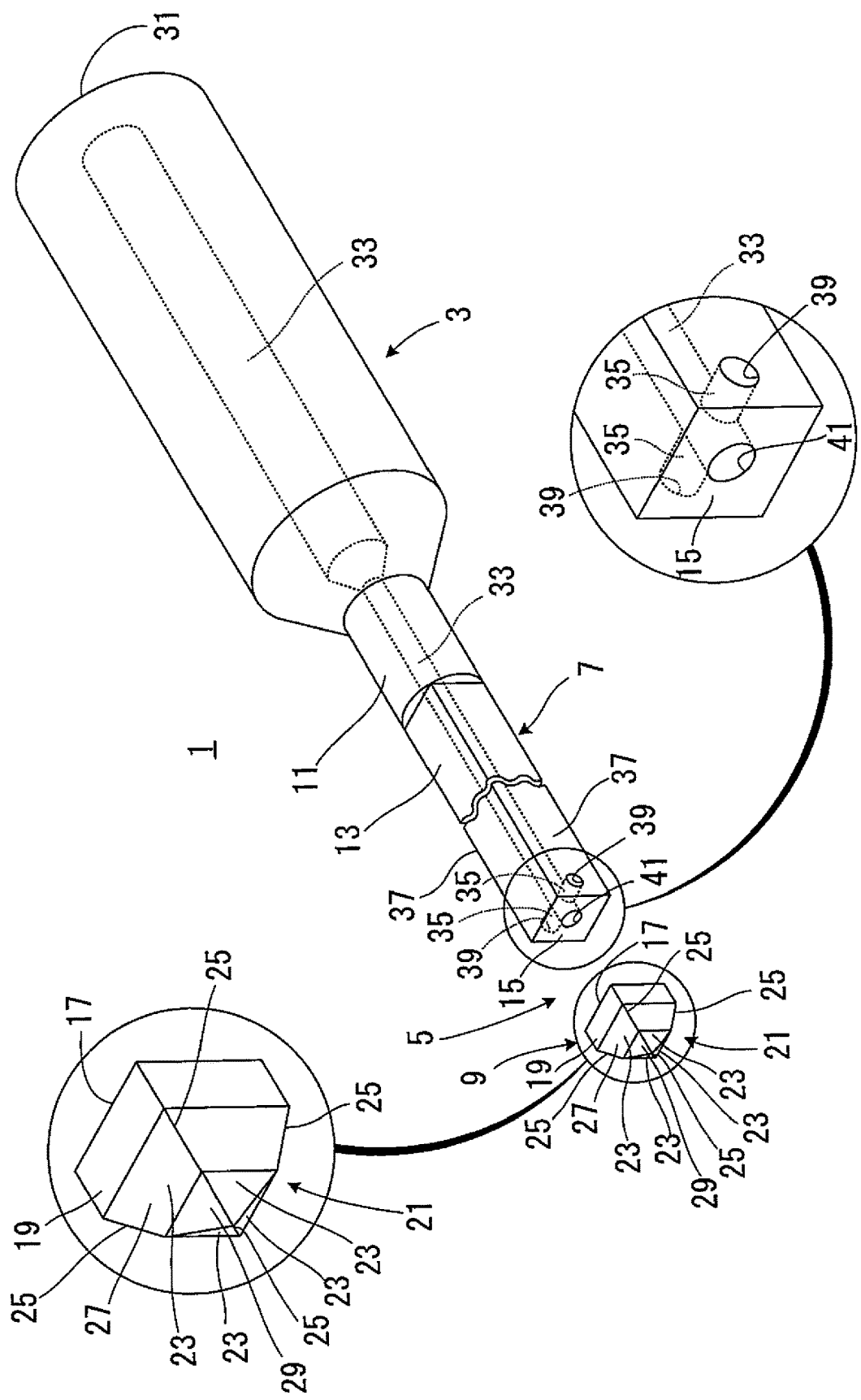
FIG. 2 is an exploded perspective view of the first drill.
Figure 3:
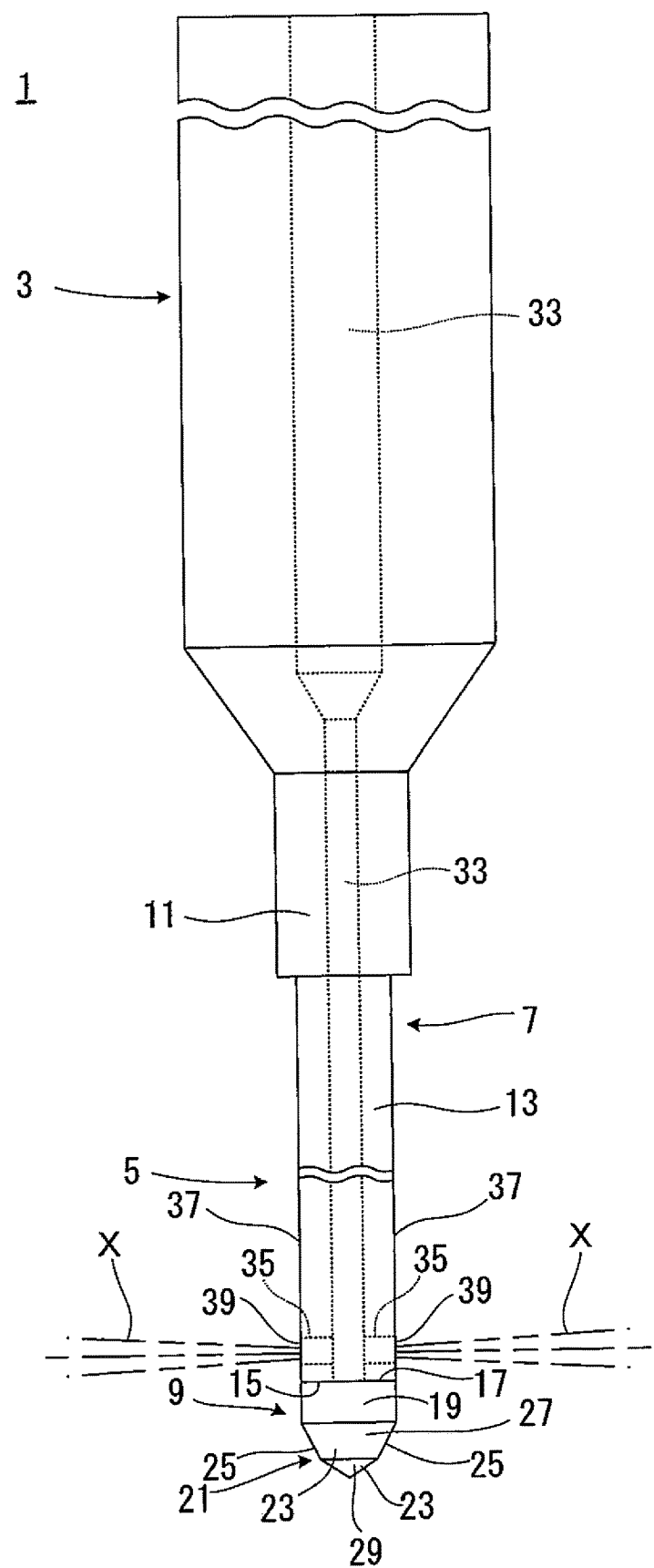
FIG. 3 is a front view of the first drill.

With reference to FIGS. 1 to 3, a configuration of the first drill 1 according to the present invention is described.

Figure 4:
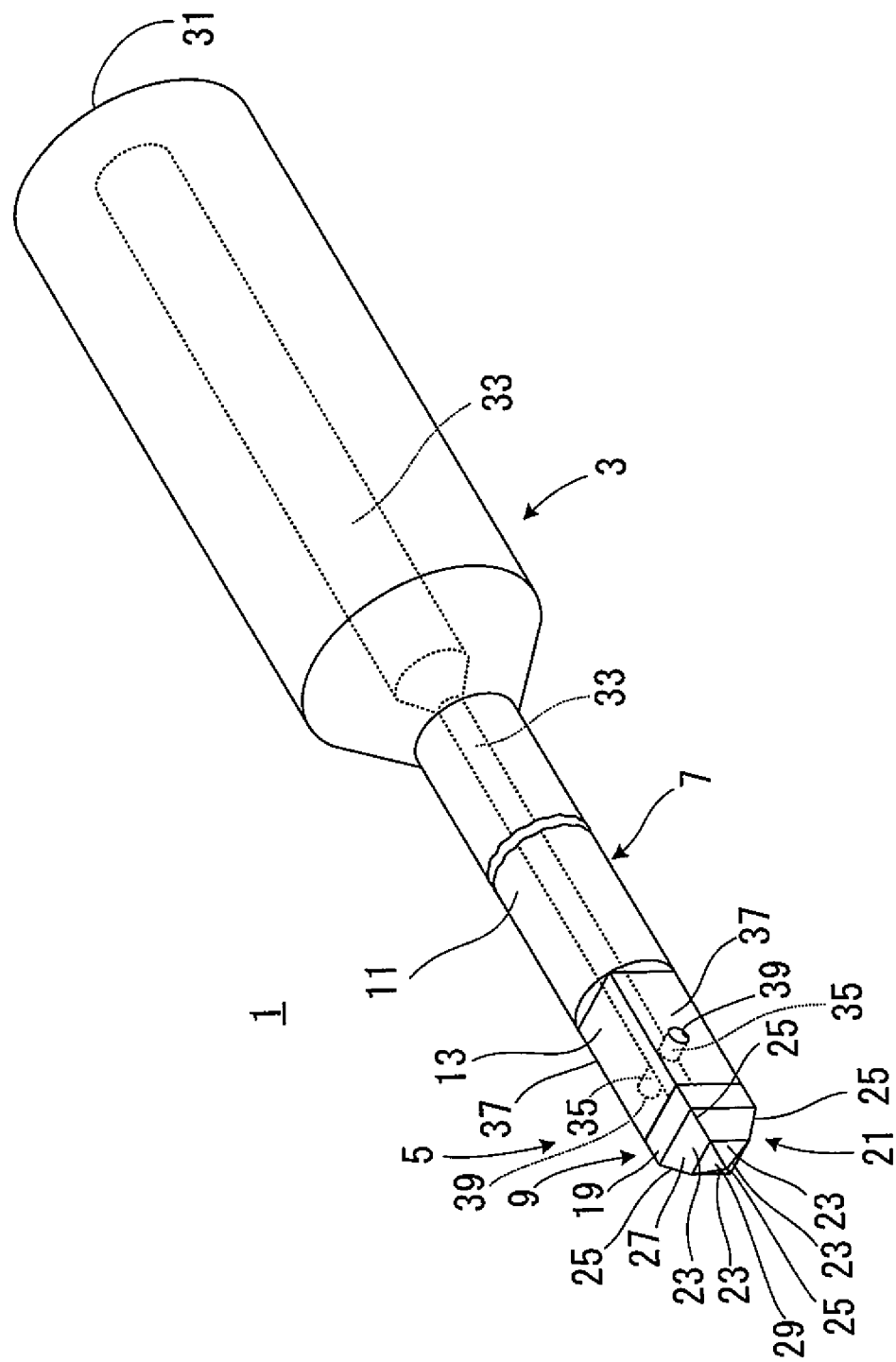
FIG. 4 is a view showing a modification of a drill shaft of the first drill.

The first drill 1 is a thin drill or a very thin micro drill for drilling a hole of a small diameter or very small diameter of 0.3 mm to 2.0 mm in a product made of a hard brittle material such as glass, ceramics or silicon. The first drill 1 has a cylindrical shank 3 and a drill shaft 5 which is provided integrally on a leading end of the shank 3. The shank 3 has a leading end part formed in a trapezoidal cross-section. The drill shaft 5 has a shaft body 7 integrally formed continuously with the leading end of the shank 3, and a drill part 9 fixed on a leading end of the shaft body 7. The shaft body 7 is integrally formed with a short cylindrical base end part 11 provided integrally on the leading end of the shank 3, and a square prism shaped body part 13 extending from a leading end of the base end part 11. The drill part 9 is fixed on a leading end surface 15 of the body part 13, for example, by brazing. As shown in FIG. 4, in some cases, the base end part 11 may be formed relatively long, while the body part 13 may be formed relatively short. The material of the shank 3 and the shaft body 7 may be micro grain cemented carbide, super micro grain cemented carbide, high-speed steel or stainless steel. On the other hand, the material of the drill part 9 may be diamond-coated micro grain cemented carbide, diamond-coated super micro grain cemented carbide or diamond-coated high-speed steel, single-crystal diamond, polycrystalline diamond, metal bond, diamond-elelctroplated micro grain cemented carbide, diamond-electroplated super micro grain cemented carbide or diamond-electroplated high-speed steel.

The drill part 9 is integrally formed with a base part 19 of a short square prism shape having a square bottom face 17 coincident with the leading end surface 15 or a cross-section of a leading end of the body part 13 of the shaft body 7, and a drilling edge part 21 (cutting edge part) of a square pyramid shape having a bottom face of the same size as the base part 19. The drilling edge part 21 has four ridge lines 25 which function as drilling edges (cutting edges). Each ridge line 25 is at each of four angled parts defined by circumferentially adjacent triangular side parts 23 (each folded in the middle). The drilling edge part 21 has a two-step structure, and is integrally formed with a base side part 27 with steep sloping sides and a leading end part 29 with relatively gentle sloping sides. The drilling edge part 21 may have a stepless structure with uniformly sloping sides or a three-step structure. Further, in some cases, depending on a physical property of a workpiece being drilled, the drilling edge part 21 may have a four-step structure or a five-step structure.

The shank 3 and the shaft body 7 has a coolant hole 33 which extends through from a rear end surface 31 of the shank 3 to the leading end surface 15 of the body part 13 of the shaft body 7 along an axis of the shank 3 and the shaft body 7. A leading end part of the coolant hole 33 is branched into a pair of discharge holes 35, at a position slightly toward the base end or toward the rear relative to the leading end surface 15 of the body part 13. The discharge holes 35 branch off and extend in the opposite directions, perpendicular to the coolant hole 33, respectively, and open at opposite side surfaces 37, 37 to define discharge ports 39, 39 (discharge opening). For the body part 13 which is formed short, in some cases, the discharge holes 35 and discharge ports 39 may be formed in a center part of the body part 13, or at a position slightly toward a leading end relative to a middle of the body part 13 (refer to FIG. 4).

The first drill 1 is configured in the following manner. The coolant hole 33 has a leading end opening 41 (coolant opening) opening at the leading end surface 15 of the body part 13. The drill part 9 is fixed on the leading end surface 15 of the body part 13 so as to close the leading end opening 41 with the bottom face 17 of the drill part 9. Each of a diagonal line of the bottom face 17 of the drill part 9 and a diagonal line of a cross-section of the body part 13 is designed slightly longer than a diameter of the base end part 11.

In the first drill 1, the coolant hole 33 is formed through the shank 3 and shaft body 7, but is not formed in the drill part 9, therefore, it is easy to manufacture the shank 3, the shaft body 7 and the drill part 9 of the first drill 1. And, as shown in FIG. 3, during drilling operation, a coolant fluid X is discharged in opposite directions near the drilling edge part 21.

More specifically, the first drill 1 may be formed so as to drill a hole of a diameter, for example, of 0.6 mm to 0.9 mm. The coolant hole 33 extending through the body part 13 may have a diameter, for example, of 0.15 mm to 0.25 mm, the discharge hole 35 and the discharge port 39 may have a diameter, for example, of 0.1 mm to 0.2 mm. The discharge hole 35 and the discharge port 39 may be spaced a distance, for example, of 0.3 mm to 0.5 mm rearward of the leading end surface 15 of the body part 13 (the distance between the leading end surface 15 and the leading end or the front end of the discharge hole 35 or the discharge port 39).

Figure 5:
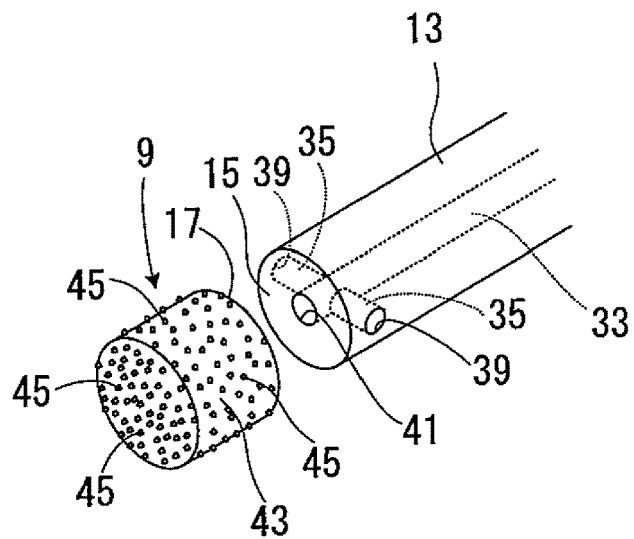
FIG. 5 is a view showing a first modification of the drill part.
Figure 5:
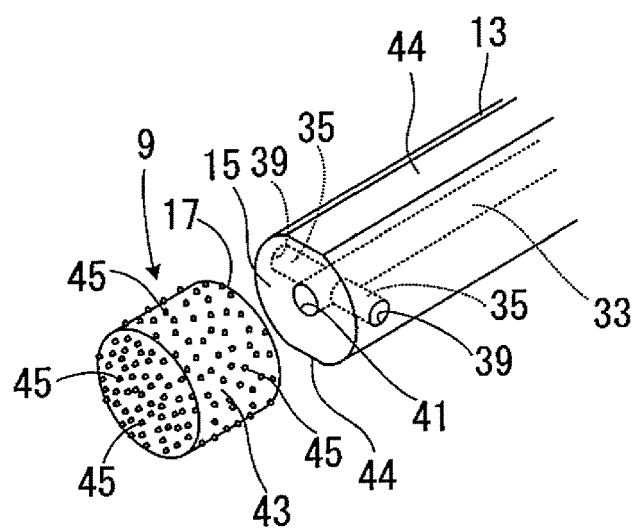
Figure 5:
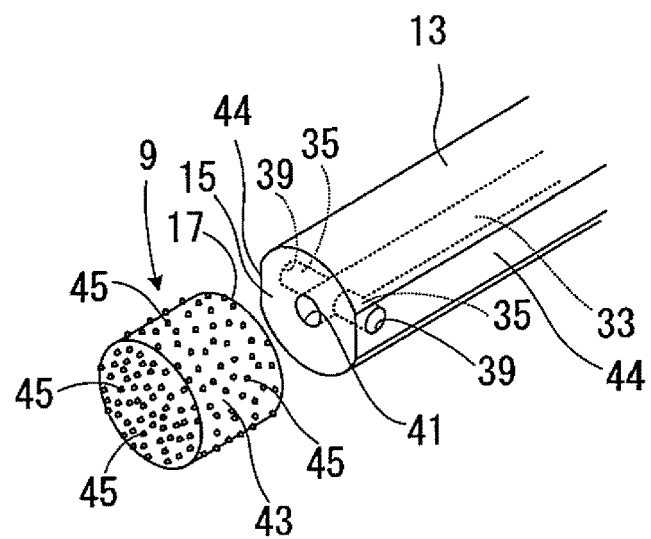

FIG. 5 is a view showing a first modification of the drill part 9.

Figure 6:
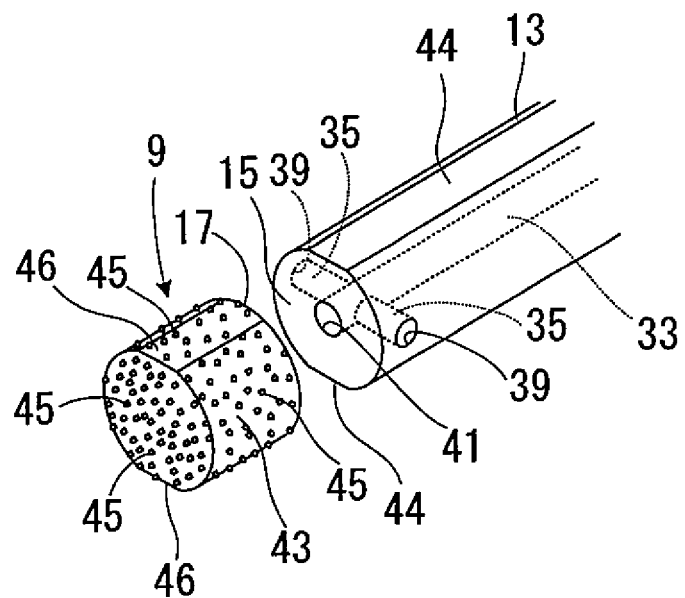
FIG. 6 is a view showing another example of the first modification of the drill part.
Figure 6:
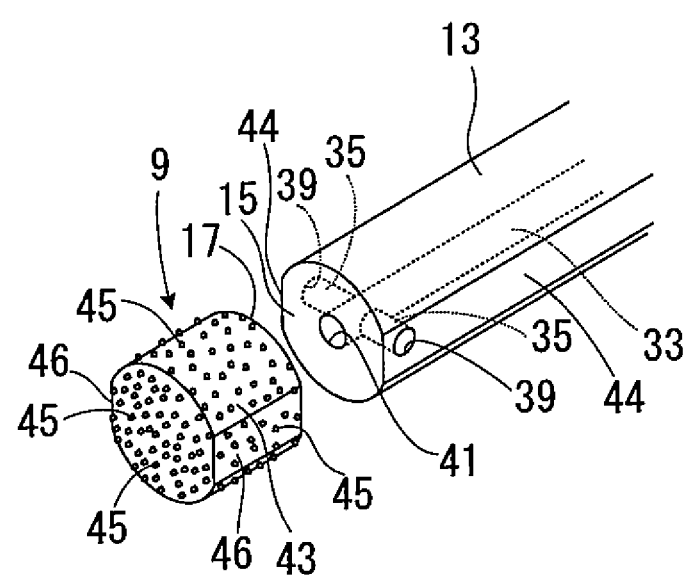

For the drill part 9 as shown in FIG. 5a, a short cylindrical body 43 is applied. The short cylindrical body 43 is made of diamond-electroplated micro grain cemented carbide, diamond-electroplated super micro grain cemented carbide, or diamond-electroplated high-speed steel. Here, the entire cylindrical body 43 defines the cutting edge part, and diamond bits 45 on a surface of the cylindrical body 43 define cutting edges. The body part 13 of the shaft body 7 is of cylindrical shape somewhat smaller in diameter than the base end part 11, while the cylindrical body 43 is somewhat larger in diameter than the body part 13, for example, somewhat larger in diameter than the base end part 11. And, the material for the cylindrical body 43 may also include metal bond. The bottom face 17 of the cylindrical body 43 is fixed on the leading end surface 15 of the body part 13, for example, by brazing, and a leading end opening 41 of the coolant hole 33 opening at the leading end surface 15 is closed by the bottom face 17. As shown in FIG. 5b, the body part 13 may be formed with a cut out part or flat part 44 on its outer peripheral surface adapted for discharge. According to FIG. 5b, the flat part 44 is formed between the discharge ports 39, 39, but the flat part 44 may be formed at positions corresponding to the discharge ports 39, 39 as in FIG. 5c. The body part 13 in FIGS. 5b and 5c may have an outer diameter (outer diameter other than the flat part 44) same as that in FIG. 5a, or larger than that in FIG. 5a. And, as shown in FIGS. 6a and 6b, the cylindrical body 43 may be formed with a flat part 46 corresponding to the flat part 44.

A pair of the discharge holes 35 which are branched from the leading end part of the coolant hole 33 open at radially opposite sides on an outer peripheral surface of the cylindrical body part 13, to define the discharge ports 39, 39.

More specifically, the first drill 1 in the first modification may be formed so as to drill a hole of a diameter, for example, of 0.6 mm to 0.9 mm. The coolant hole 33 extending through the body part 13 may have a diameter, for example, of 0.15 mm to 0.25 mm, the discharge hole 35 and the discharge port 39 may have a diameter, for example, of 0.1 mm to 0.2 mm, and may be spaced a distance, for example, of 0.3 mm to 0.5 mm rearward of the leading end surface 15 of the body part 13 (the distance between the leading end surface 15 and the leading end or the front end of the discharge hole 35 or the discharge port 39).

Figure 7:
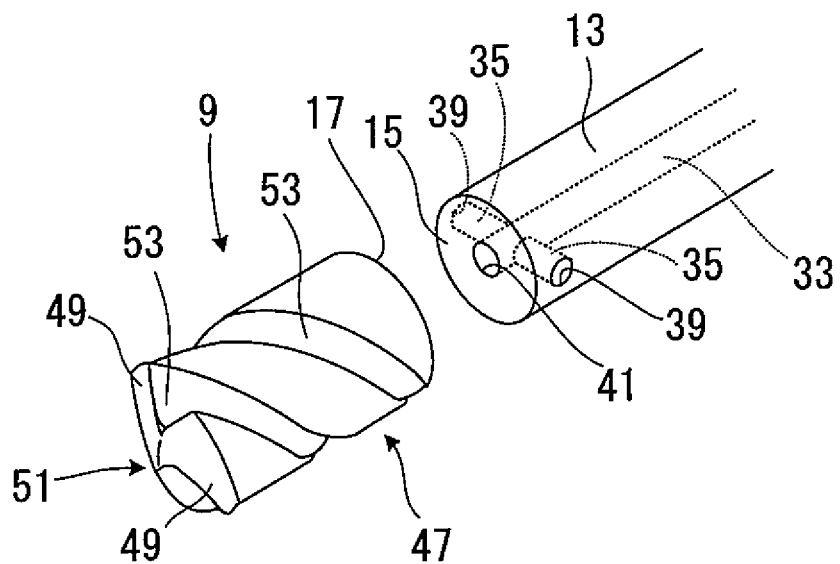
FIG. 7 is a view showing a second modification of the drill part.
Figure 7:
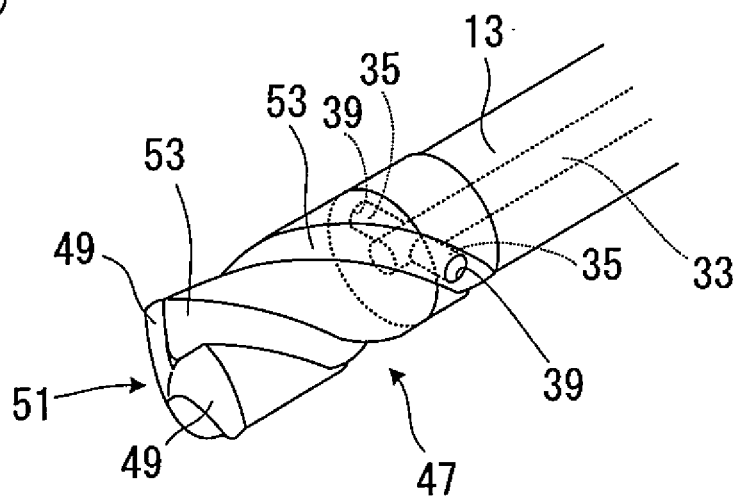

FIG. 7 is a view showing a second modification of the drill part 9.

A cylindrical body 47 which is applied for the drill part 9 as shown in FIG. 7a is made of sintered diamond, single crystal diamond, polycrystalline diamond, diamond-electroplated micro grain cemented carbide, diamond-electroplated super micro grain cemented carbide or diamond-electroplated high-speed steel. The cylindrical body 47 has a drilling edge part 51 having a pair of drilling edges 49 on a leading end part of the cylindrical body 47. The cylindrical body 47 is of a unitary short cylindrical shape which is formed with chip discharge flutes helically extending the entire length from the leading end part to a base part of the cylindrical body 47, and the chip discharge flutes 53 are short in length. The body part 13 of the shaft body 7 has a cylindrical shape somewhat smaller in diameter than the cylindrical body 47, for example, such that a bottom at a rear end of the discharge flutes 53 conforms to or substantially conforms to an outer peripheral surface of the body part 13. The cylindrical body 47 is, for example, somewhat larger in diameter than the body part 13, and for example, somewhat larger in diameter than the base end part 11. The bottom face 17 of the cylindrical body 47 is fixed on the leading end surface 15 of the body part 13, for example, by brazing to close a leading end opening 41 of the coolant hole 33 which opens at the leading end surface 15. In a modification as shown in FIG. 7b, the helical chip discharge flutes 53 formed in the cylindrical body 47 extend from the leading end part of the cylindrical body 47 to positions of the discharge holes 35 or the discharge ports 39 of the body part 13, beyond the base part of the cylindrical body 47. Here, the leading end part of the body part 13 to be formed with discharge flutes 53 is formed somewhat larger in diameter than a rear part of the body part 13, and bottoms of the discharge flutes 53 in the leading end part of the body part 13 may conform to or substantially conform to an outer peripheral surface of the rear part of the body part 13. The helical discharge flutes 53 may extend beyond the positions of the discharge holes 35 or the discharge ports 39 of the body part 13, as long as mechanical strength of the body part 13 is not significantly lowered.

The pair of the discharge holes 35 which are branched from a leading end part of the coolant hole 33 open at radially opposite sides of an outer peripheral surface of the cylindrical body part 13 to define the discharge ports 39, 39. In the modification as shown in FIG. 7b, the discharge ports 39, 39 open in the discharge flutes 53, respectively.

More specifically, here, the first drill 1 in the second modification may be formed so as to drill a hole of a diameter, for example, of 0.6 mm to 0.9 mm. The coolant hole 33 extending through the body part 13 may have a diameter, for example, of 0.15 mm to 0.25 mm, the discharge hole 35 and the discharge port 39 may have a diameter, for example, of 0.1 mm to 0.2 mm, and may be spaced a distance, for example, of 0.3 mm to 0.5 mm rearward of the leading end surface 15 of the body part 13 (the distance between the leading end surface 15 and the leading end or the front end of the discharge hole 35 or the discharge port 39).

Figure 8:
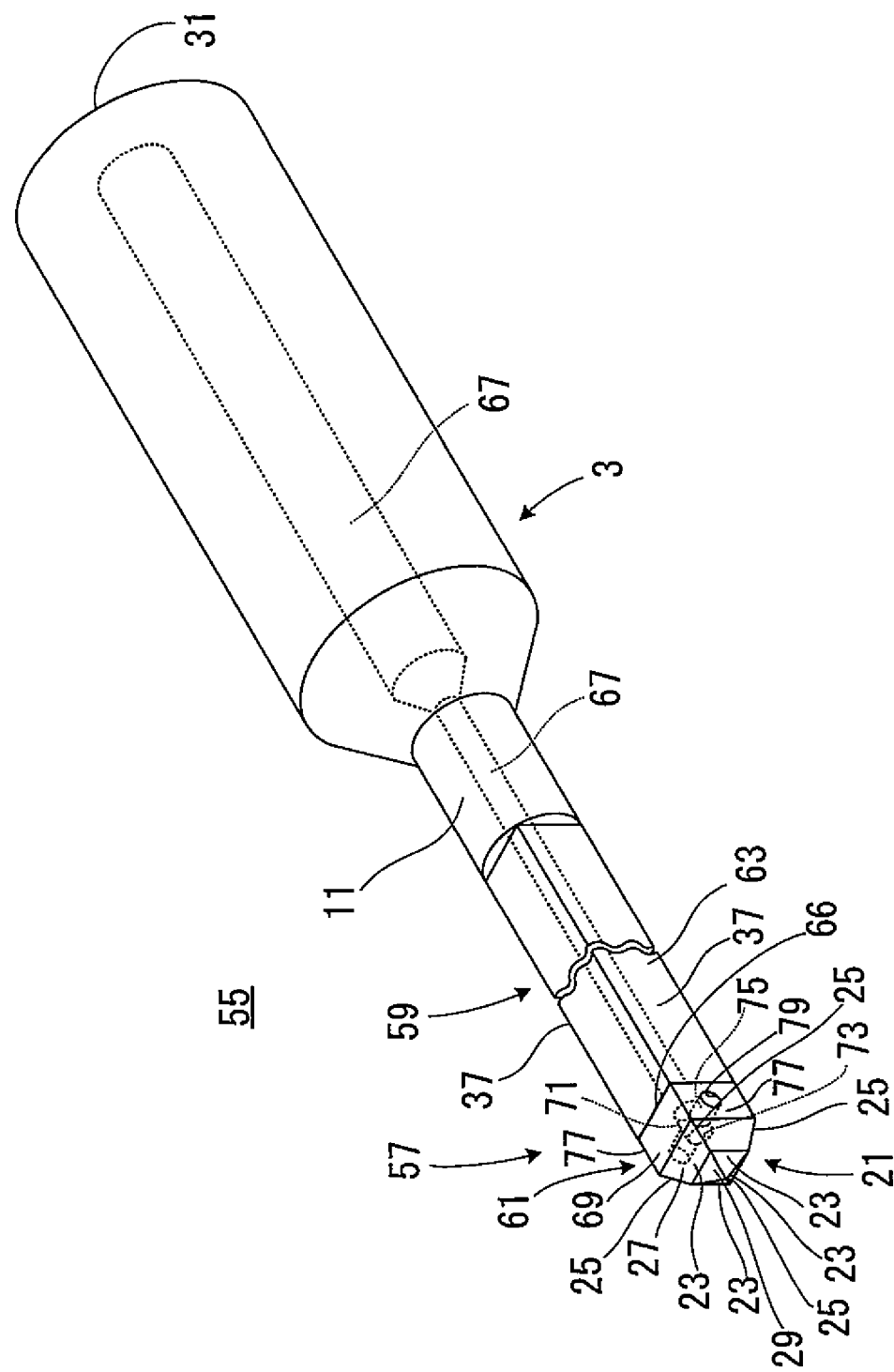
FIG. 8 is a perspective view showing a whole shape of a second drill of the present invention.
Figure 9:
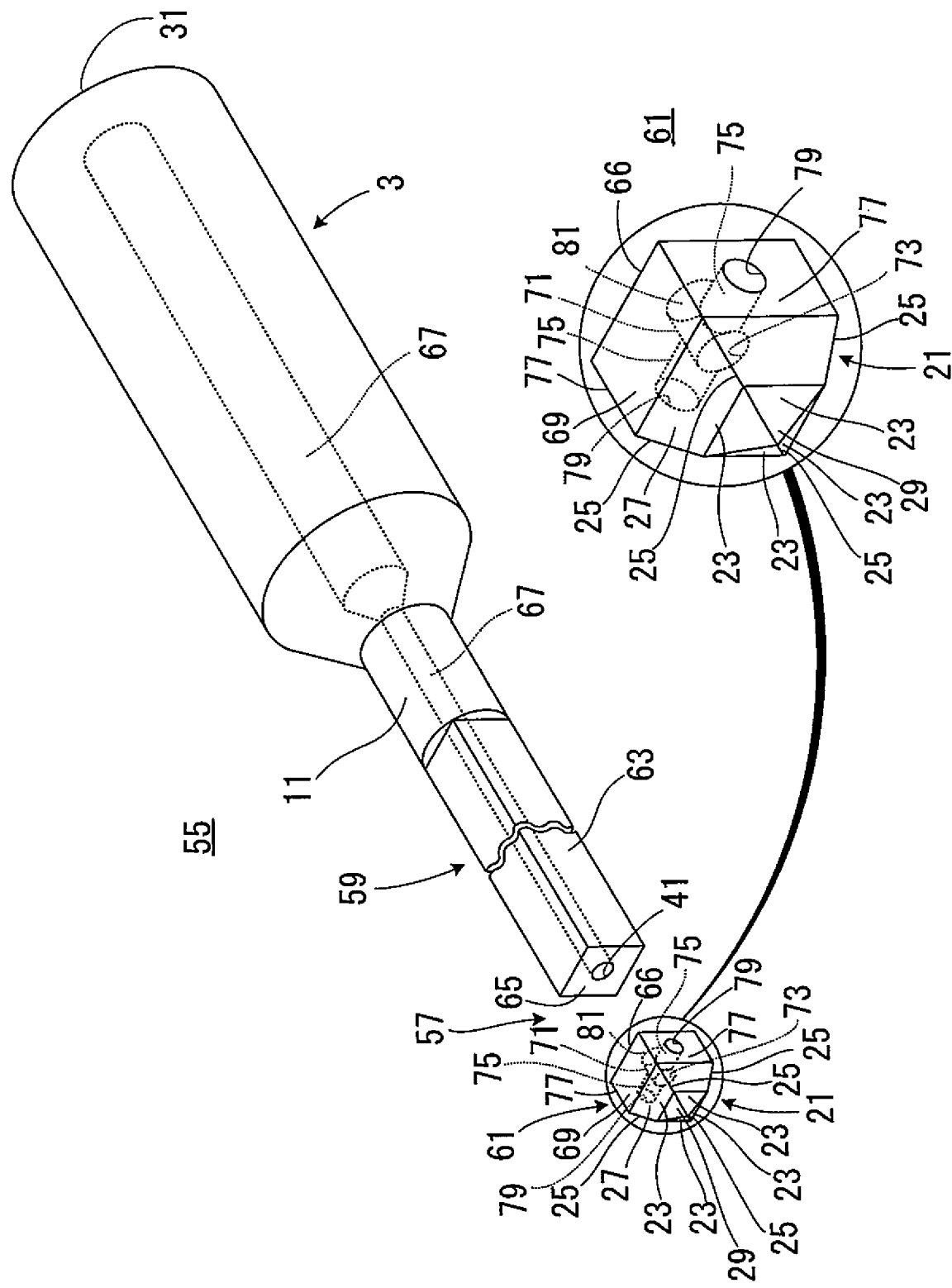
FIG. 9 is an exploded perspective view of the second drill.
Figure 10:
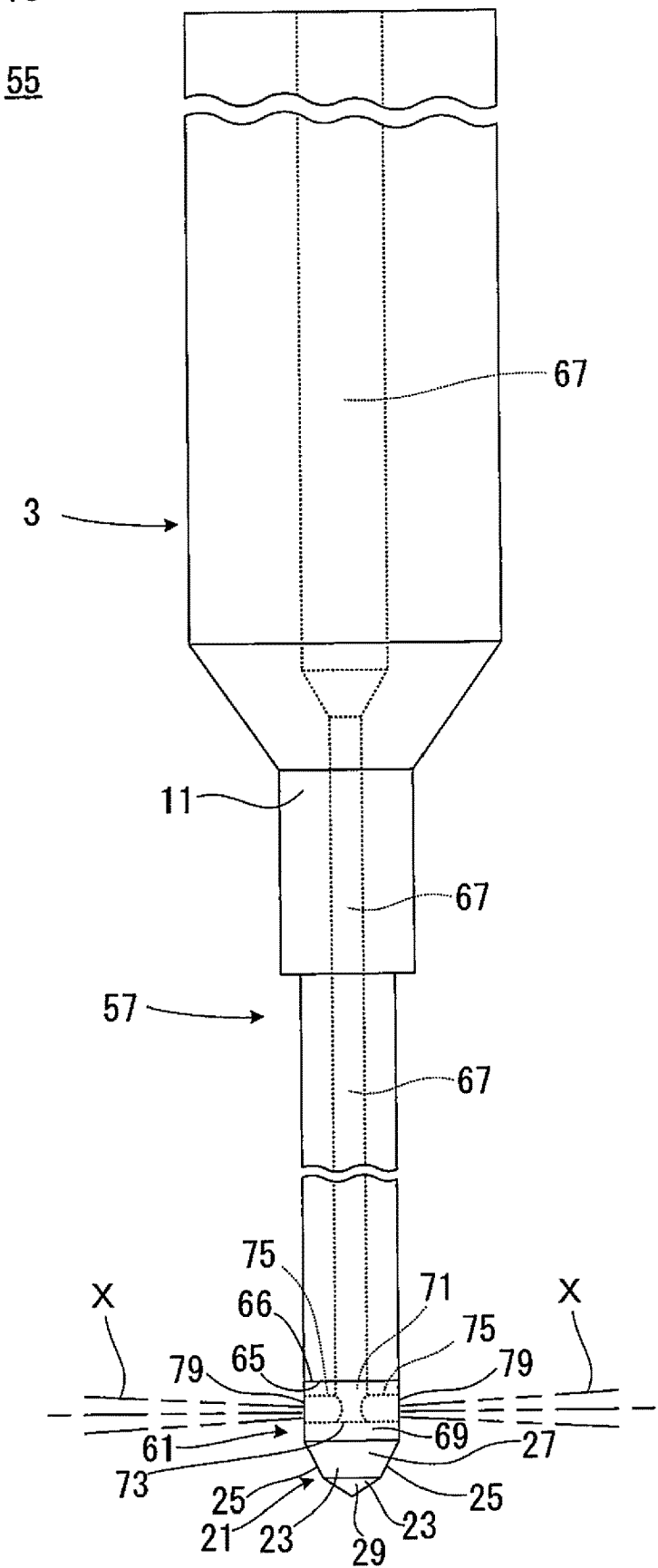
FIG. 10 is a front view of the second drill.

Now, referring to FIGS. 8 to 10, the configuration of a second drill according to the present invention is described.

Figure 11:
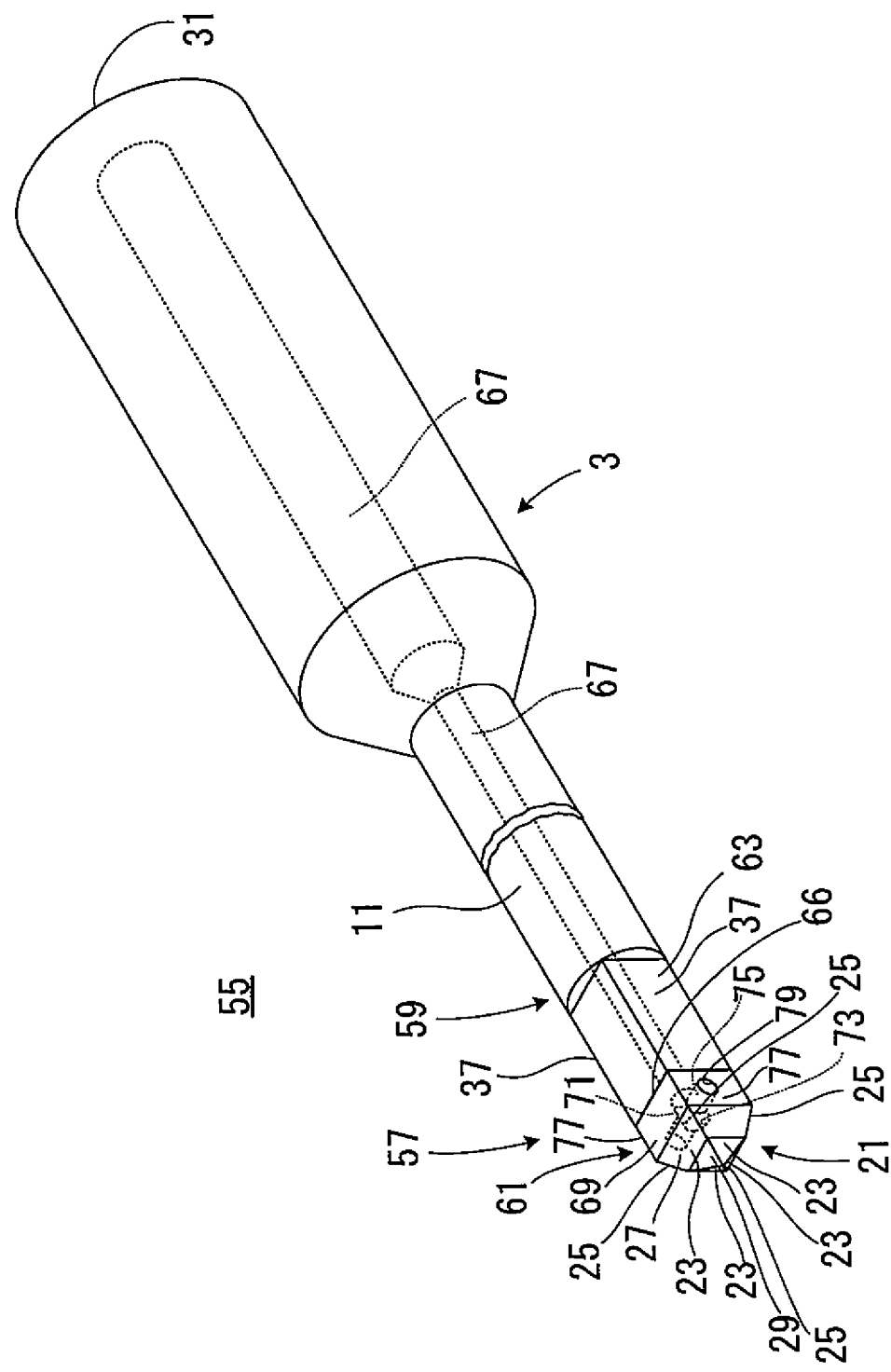
FIG. 11 is a view showing a modification of a drill shaft of the second drill.

The second drill 55 relates to a thin drill or a very thin micro drill for drilling a hole of a small diameter or very small diameter of 0.3 mm to 2.0 mm in a product made of a hard brittle material such as glass, ceramics or silicon. The second drill 55 is configured by modifying the configuration of the leading end part of the coolant hole 33 and the design of the drill part 9 of the first drill 1, and other configuration of the second drill 55 is identical with that of the first drill 1, therefore, the same reference numerals are employed for identical parts as in the first drill 1. The second drill 55 has a shank 3 and a drill shaft 57 which is provided integrally on a leading end of the shank 3. The drill shaft 57 has a shaft body 59 integrally formed continuously with the leading end of the shank 3, and a drill part 61 fixed on a leading end of the shaft body 59. The shaft body 59 is integrally formed with a short cylindrical base end part 11 provided integrally on the leading end of the shank 3, and a body part 63 of a square prism shape extending from a leading end of the base end part 11. The drill part 61 is fixed on a leading end surface 65 of the body part 63, for example, by brazing. As shown in FIG. 11, in some cases, the base end part 11 may be formed relatively long, while the body part 63 may be formed relatively short. The material of the shank 3 and the shaft body 59 may be micro grain cemented carbide, super micro grain cemented carbide, high-speed steel or stainless steel. On the other hand, the material of the drill part 61 may be diamond-coated micro grain cemented carbide, diamond-coated super micro grain cemented carbide or diamond-coated high-speed steel, or single-crystal diamond, polycrystalline diamond or metal bond, or diamond-electroplated micro grain cemented carbide, diamond-electroplated super micro grain cemented carbide or diamond-electroplated high-speed steel.

The drill part 61 is integrally formed with a base part 69 of a short square prism shape having a square bottom face 66 coincident with the leading end surface 65 or a cross-section of a leading end of the body part 63 of the shaft body 59 and a drilling edge part 21 (cutting edge part) of a square pyramid shape having a bottom face of the same size as the base part 69. The base part 69 is somewhat larger in thickness than the base part 19 of the first drill 1. The drilling edge part 21 has four ridge lines 25 which function as drilling edges (cutting edge). Each ridge line 25 is at each of four angled parts defined by circumferentially adjacent triangular side surface parts 23 (each folded in the middle). The drilling edge part 21 has a two-step structure, and is integrally formed with a base side part 27 with steep sloping sides and a leading end part 29 with relatively gentle sloping sides. The drilling edge part 21 may have a stepless structure with equally sloping sides or a three-step structure. Further, in some cases, depending on a physical property of a workpiece being drilled, the drilling edge part 21 may have a four-step structure or a five-step structure.

The shank 3 and the shaft body 59 have a body part coolant hole 67 which extends through from a rear end surface 31 of the shank 3 to the leading end surface 65 of the body part 63 of the shaft body 59 along an axis of the shank 3 and the shaft body 59. The drill part 61 has a short drill coolant hole 71 which extends from the bottom face 66 along an axis of the drill part 61. The drill coolant hole 71 has a terminal end 73 terminating in the base part 69. The terminal end 73 is branched into a pair of discharge holes 75. The pair of the discharge holes 75 extend in opposite directions perpendicular to the drill coolant hole 71, and open at opposite side surfaces 77, 77 to define discharge ports 79, 79. The terminal end 73 of the drill coolant hole 71 does not project relative to the discharge holes 75, 75. Or, the terminal end 73 of the drill coolant hole 71 is located at the same position as a front end of the discharge hole 75 (specifically refer to FIG. 10).

In the second drill 55, the bottom face 66 of the drill part 61 is fixed on the leading end surface 65 of the body part 63, for example, by brazing, such that the leading end opening 41 of the body coolant hole 67 at the leading end surface 65 of the body part 63 conforms to a rear end openings 81 of the drill coolant hole 71 at the bottom face 66 of the base part 69. Each of a diagonal line of the bottom face 66 of the drill part 61 and a diagonal line of a cross-section of the body part 63 is designed slightly longer than a diameter of the base end part 11.

In the second drill 55, the body coolant hole 67 extends through the shank 3 and the shaft body 59, and the drill coolant hole 71 is relatively short in length. Therefore, the shank 3, the shaft body 59 and the drill part 61 can be easily manufactured. Further, as shown in FIG. 10, during drilling operation, a coolant fluid X is discharged in opposite directions near the drilling edge part 21.

More specifically, here, the second drill 55 may be formed so as to drill a hole of a diameter, for example, of 0.6 mm to 0.9 mm. The body coolant hole 67 extending through the body part 63 and the drill coolant hole 71 may have a diameter, for example, of 0.15 mm to 0.25 mm, the discharge hole 75 and the discharge port 79 may have a diameter, for example, of 0.1 mm to 0.2 mm, and may be spaced a distance, for example, of 0.15 mm to 0.2 mm forward of the bottom face 66 of the drill part 61 (the distance between the bottom face 66 and a rear end of the discharge hole 75 or the discharge port 79).

REFERENCE SIGNS LIST

1. First drill
3. Shank
5, 57 Drill shaft
7, 59 Shaft body
9, 61 Drill part
21 Drilling edge part
25 Ridge line (drilling edge)
33 Coolant hole
35, 75 Discharge hole
39, 79 Discharge port
55 Second drill
67 Body coolant hole
71 Drill coolant hole

What is claimed is:

1. A drill for drilling a small diameter hole, comprising:
a shank;
a drill shaft provided on the shank, the drill shaft having a shaft body extending from a leading end of the shank;
a drill part fixedly attached on a leading end of the shaft body with a bottom face of the drill part fixed on a leading end surface at the leading end of the shaft body, the drill part having a cutting edge part provided with a cutting edge;
wherein the shank and the shaft body define a coolant hole extending along an axis therein, the coolant hole opening at a coolant opening defined in a leading end surface of the shaft body that is axially furthest from the shank; and
wherein the shaft body defines a discharge hole that is branched from the coolant hole and opening at an outer periphery of the shaft body to define a discharge opening, the coolant opening at the leading end surface of the shaft body being closed off by the bottom face of the drill part to prevent flow from the coolant hole via the coolant opening.

2. The drill as set forth in claim 1, wherein the discharge hole is formed at a position rearward of the leading end surface of the shaft body on which the bottom face of the drill part is fixed.

3. The drill as set forth in claim 2, wherein the shaft body has an outer peripheral surface without a helical discharge flute, and the drill part having an outer peripheral surface without a helical discharge flute.

4. A drill for drilling a small diameter hole, comprising: a shank; a drill shaft provided on the shank, the drill shaft having a shaft body extending from a leading end of the shank, and a drill part fixedly attached on a leading end of the shaft body with a bottom face of the drill part fixed on a leading end surface at the leading end of the shaft body, the drill part having a cutting edge part provided with a cutting edge; a coolant hole extending along an axis in the shank and the shaft body, the coolant hole opening at a coolant opening defined in a leading end surface of the shaft body; and a discharge hole formed by being branched from the coolant hole in a leading end part of the shaft body, the discharge hole opening at an outer periphery of the shaft body to define a discharge opening, the coolant opening at the leading end surface of the shaft body being closed off by the bottom face of the drill part to prevent flow from the coolant hole via the coolant opening;
wherein the discharge hole is formed at a position rearward of the leading end surface of the shaft body on which the bottom face of the drill part is fixed; and
wherein the shaft body has a base end part extending from the leading end of the shank, and a body part extending from a leading end of the base end part, the drill part being fixedly attached to a leading end surface of the body part and closing the coolant opening at the leading end surface of the body part, wherein the body part is formed into a prism shape including a square prism shape, the body part having an outer peripheral surface without a helical discharge flute, wherein the drill part has the cutting edge part formed into a pyramid shape including a square pyramid shape, the drill part having an outer peripheral surface without a helical discharge flute, wherein the discharge hole is formed at a position rearward of the leading end surface in a leading end part of the body part, the discharge hole opening at the outer peripheral surface of the body part to define the discharge opening.

5. A drill for drilling a small diameter hole, comprising: a shank; a drill shaft provided on the shank, the drill shaft having a shaft body extending from a leading end of the shank, and a drill part fixedly attached on a leading end of the shaft body with a bottom face of the drill part fixed on a leading end surface at the leading end of the shaft body, the drill part having a cutting edge part provided with a cutting edge; a coolant hole extending along an axis in the shank and the shaft body, the coolant hole opening at a coolant opening defined in a leading end surface of the shaft body; and a discharge hole formed by being branched from the coolant hole in a leading end part of the shaft body, the discharge hole opening at an outer periphery of the shaft body to define a discharge opening, the coolant opening at the leading end surface of the shaft body being closed off by the bottom face of the drill part to prevent flow from the coolant hole via the coolant opening;
wherein the discharge hole is formed at a position rearward of the leading end surface of the shaft body on which the bottom face of the drill part is fixed; and
wherein the shaft body has a base end part extending from the leading end of the shank, and a body part extending from a leading end of the base end part, the drill part being fixedly attached to a leading end surface of the body part and closing the coolant opening at the leading end surface of the body part, wherein the body part is formed into a cylindrical shape, the body part having an outer peripheral surface without a helical discharge flute, wherein the drill part is formed into a cylindrical shape, the drill part having an outer peripheral surface without a helical discharge flute, wherein the discharge hole is formed at a position rearward of the leading end surface in a leading end part of the body part, the discharge hole opening at the outer peripheral surface of the body part to define the discharge opening.

6. The drill as set forth in claim 2, wherein the discharge hole is spaced from the leading end surface of the shaft body by a length longer than a diameter of the coolant hole in the shaft body.

7. The drill as set forth in claim 4, wherein the discharge hole is spaced from the leading end surface of the body part by a length longer than a diameter of the coolant hole in the body part.

8. The drill as set forth in claim 3, wherein the discharge hole is formed perpendicularly with respect to the coolant hole.

9. A drill for drilling a small diameter hole, comprising:
a shank;
a drill shaft provided on the shank, the drill shaft having a shaft body extending from a leading end of the shank;
a drill part fixedly attached on a leading end of the shaft body with a bottom face of the drill part fixed on a leading end surface of the shaft body, the drill part having a cutting edge part provided with a cutting edge;
wherein the shank and the shaft body define a coolant hole extending along an axis therein, the coolant hole opening at a coolant opening defined in a leading end surface of the shaft body;
wherein the shaft body defines a discharge hole formed by being branched from the coolant hole in a leading end part of the shaft body, the discharge hole opening at an outer periphery of the shaft body to define a discharge opening, the coolant opening at the leading surface of the shaft body being closed off by the bottom face of the drill part to prevent flow from the coolant hole via the coolant opening; and
wherein the drill part is formed into a cylindrical body, the cylindrical body having the cutting edge part on a leading end of the cylindrical body and a helical discharge flute on an outer peripheral surface thereof.

10. The drill as set forth in claim 1, wherein the leading end surface of the shaft body and the bottom face of the drill part are perpendicular to the axis in the shaft body, respectively.

11. The drill as set forth in claim 1, wherein the bottom face of the drill part is fixed on the leading end surface of the shaft body by brazing.

12. The drill as set forth in claim 1, wherein the drill part is integrally formed with a base part and the cutting edge part.

13. The drill as set forth in claim 3, wherein the discharge hole is formed entirely at a position rearward of the leading end surface of the shaft body.

14. The drill as set forth in claim 1, wherein the leading end surface of the shaft body includes a flat surface for fixing, the flat surface extending perpendicular to the axis of the shaft body, and the flat surface surrounding the coolant opening of the coolant hole in a center part along an entire circumference of the coolant opening, wherein the flat surface of the shaft body is entirely fixed liquid-tight to the bottom face of the drill body to close off the coolant opening.

15. The drill as set forth in claim 4, wherein the cutting edge part has a two-step structure, the two-step structure including a base side part and a leading end part, the base side part slanting inwardly at a first angle and the leading end part slanting inwardly at a second angle that is less steep than the first angle of the base side part.

16. The drill as set forth in claim 4, wherein the outer peripheral surface of the body part formed with the discharge opening is of a rectangular shape extending parallel to an axis of the body part.

17. The drill as set forth in claim 4, wherein the cutting edge part has a three-step structure.

18. A drill for drilling a small diameter hole, comprising:
a shank;
a drill shaft provided on the shank, the drill shaft having a shaft body extending from a leading end of the shank,
a drill part fixedly attached on a leading end of the shaft body with a bottom face of the drill part fixed on a leading end surface at the leading end of the shaft body, the drill part having a cutting edge part provided with a cutting edge;
wherein the shank and the shaft body define a coolant hole extending along an axis therein, the coolant hole opening at a coolant opening defined in a leading end surface of the shaft body;
wherein the shaft body defines a discharge hole that is branched from the coolant hole and opening at an outer periphery of the shaft body to define a discharge opening, the coolant opening at the leading end surface of the shaft body being closed off by the bottom face of the drill part to prevent flow from the coolant hole via the coolant opening; and wherein the outer peripheries of the shaft body and the drill part match at the leading end surface where they are attached together.

\* \* \* \* \*